(12) United States Patent
Leonard

(10) Patent No.: US 7,555,843 B2
(45) Date of Patent: Jul. 7, 2009

(54) CONSTRUCTION LAYOUT MARKING DEVICE

(76) Inventor: Lance Leonard, 5435 Bay Meadows Rd., Omaha, NE (US) 68127

( * ) Notice: Subject to any disclaimer, the term of this patent is extended or adjusted under 35 U.S.C. 154(b) by 61 days.

(21) Appl. No.: 11/892,351

(22) Filed: Aug. 22, 2007

(65) Prior Publication Data

US 2009/0049703 A1 Feb. 26, 2009

(51) Int. Cl.
*B44D 3/38* (2006.01)
*G01B 3/10* (2006.01)

(52) U.S. Cl. ............................ 33/414; 33/759; 33/764

(58) Field of Classification Search .................... 33/1 F, 33/1 G, 413, 414, 732, 751, 754, 755, 756, 33/759, 761, 764, 771
See application file for complete search history.

(56) References Cited

U.S. PATENT DOCUMENTS

| | | | |
|---|---|---|---|
| 3,046,663 A * | 7/1962 | Romero ...................... 33/354 |
| 3,979,833 A * | 9/1976 | Grundman .................. 33/701 |
| 4,367,590 A | 1/1983 | Winter et al. | |
| 4,527,337 A | 7/1985 | Dreiling | |
| 4,670,990 A | 6/1987 | Horvath | |
| 4,819,337 A | 4/1989 | Noyes | |
| 5,063,681 A * | 11/1991 | Bradley ....................... 33/414 |
| 5,212,875 A * | 5/1993 | Corso .......................... 33/414 |
| 5,396,710 A | 3/1995 | Battaglia | |
| 5,960,554 A | 10/1999 | Kamykowski | |
| 6,360,448 B1 | 3/2002 | Smyj | |
| 6,470,581 B1 * | 10/2002 | Kolodzieski ................ 33/414 |
| 6,494,014 B2 | 12/2002 | Lafrance | |
| 6,826,845 B2 | 12/2004 | Pritchard | |
| 7,028,446 B2 | 4/2006 | Winchester | |

* cited by examiner

*Primary Examiner*—R. A. Smith
(74) *Attorney, Agent, or Firm*—Jones, Tullar & Cooper, P.C.

(57) ABSTRACT

A construction layout marking device includes a reel housing that uses a reel case to rotatably support a reel hub. A pair of spaced, parallel measuring tapes are secured, at inner ends, to the reel hub and can be coiled inside the reel case by rotation of the reel hub. A plurality of marking templates are attached to the spaced measuring tapes, at specified intervals. These marking templates can impart a line pattern to a surface above which they are placed by deployment out of the reel case. The line patterns are usable to position construction elements such as wall studs. The measuring tapes and their attached marking templates can be wound back into the reel case of the reel housing after use.

20 Claims, 5 Drawing Sheets

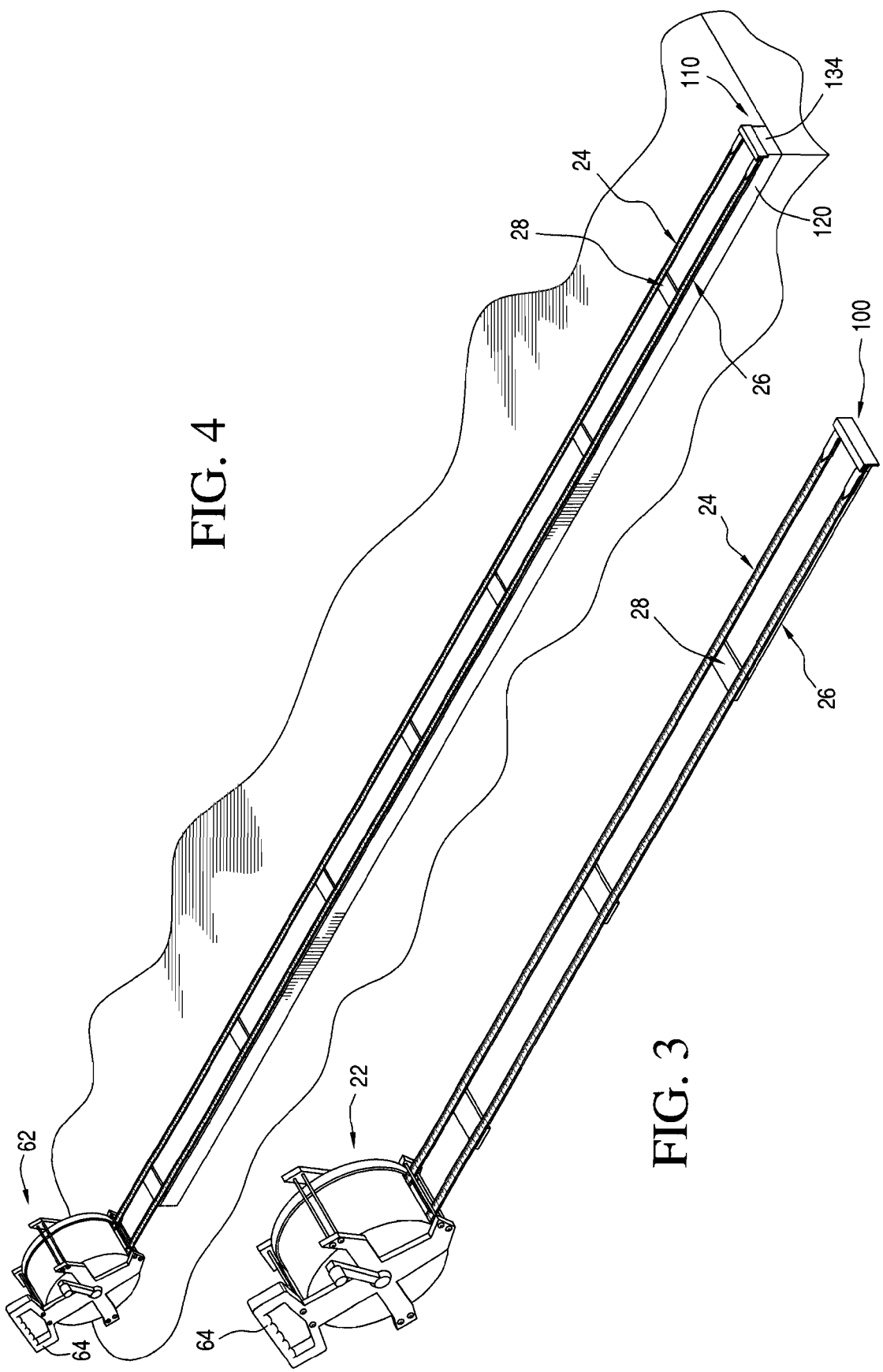

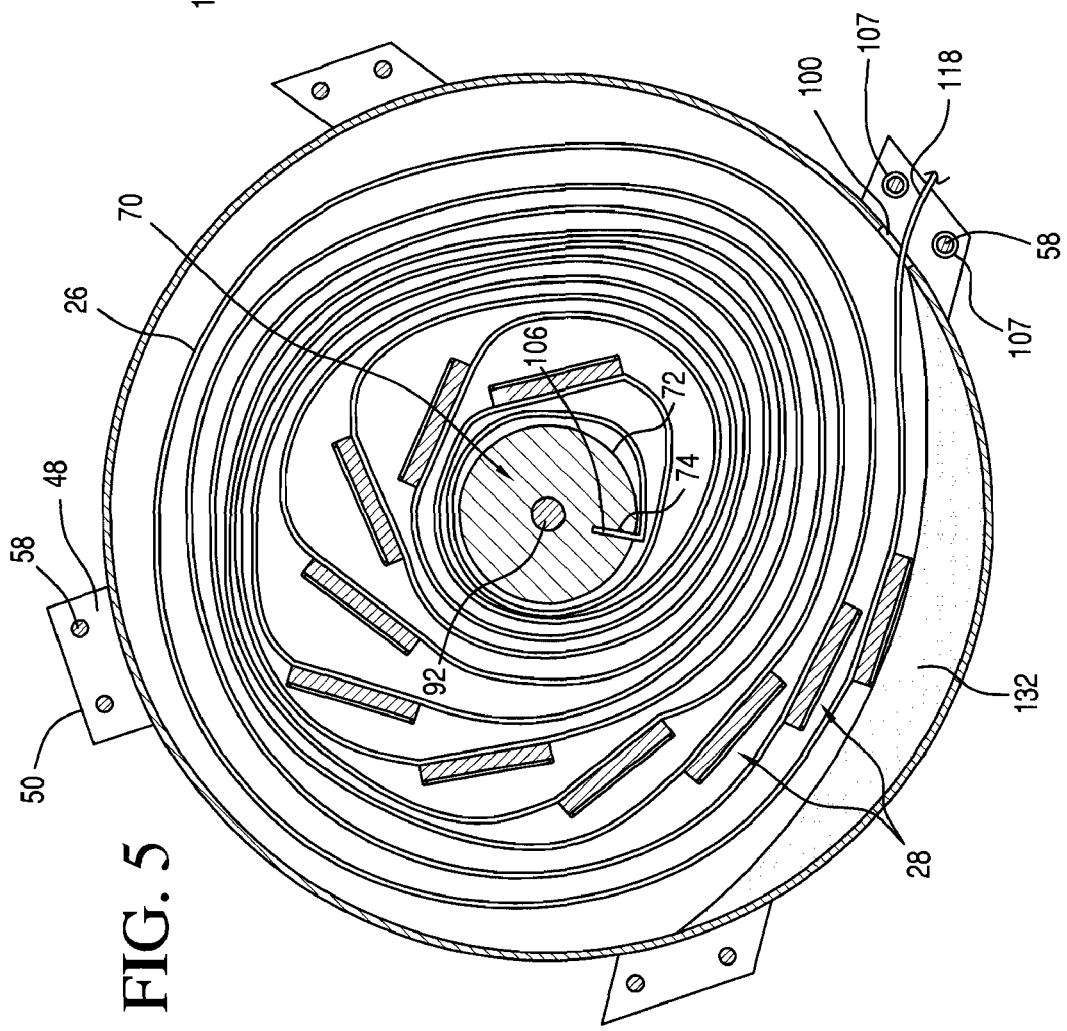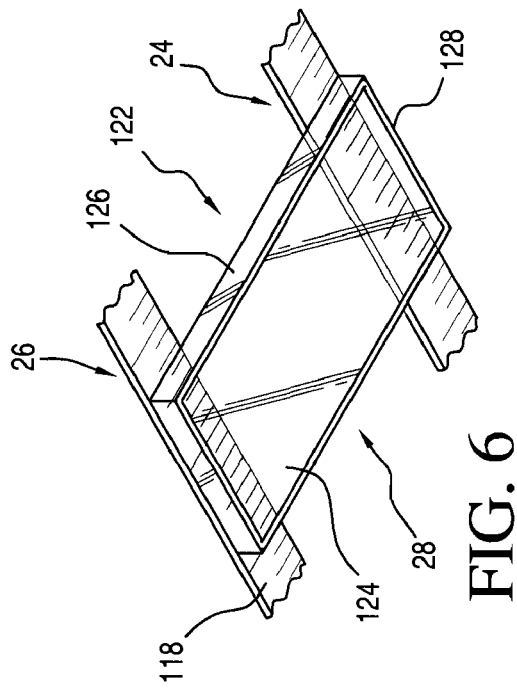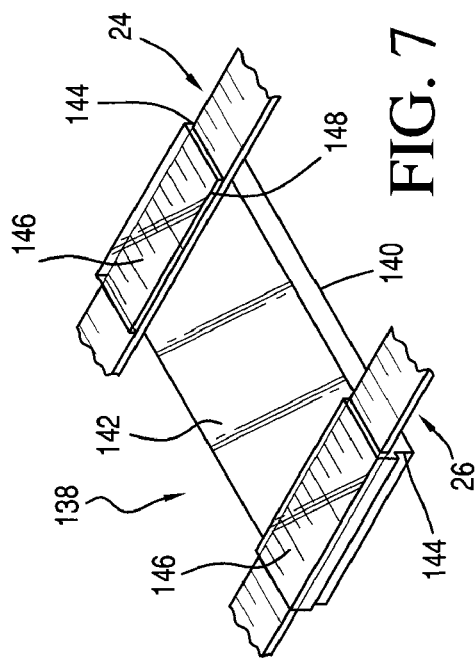

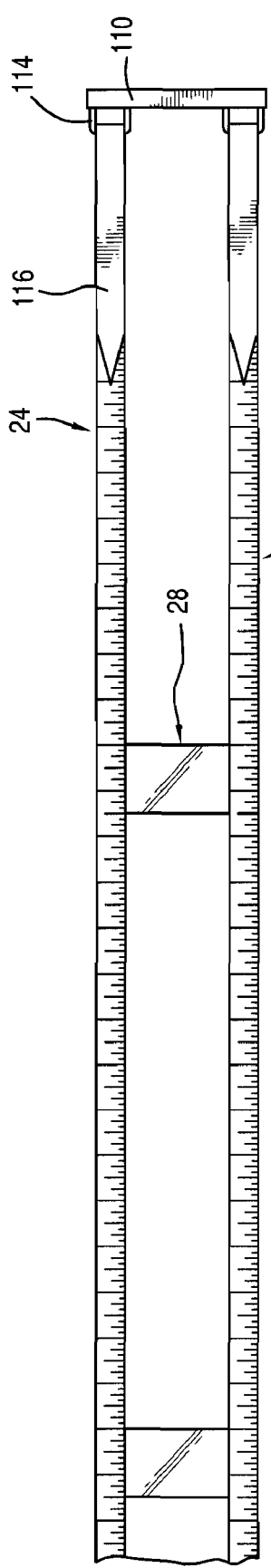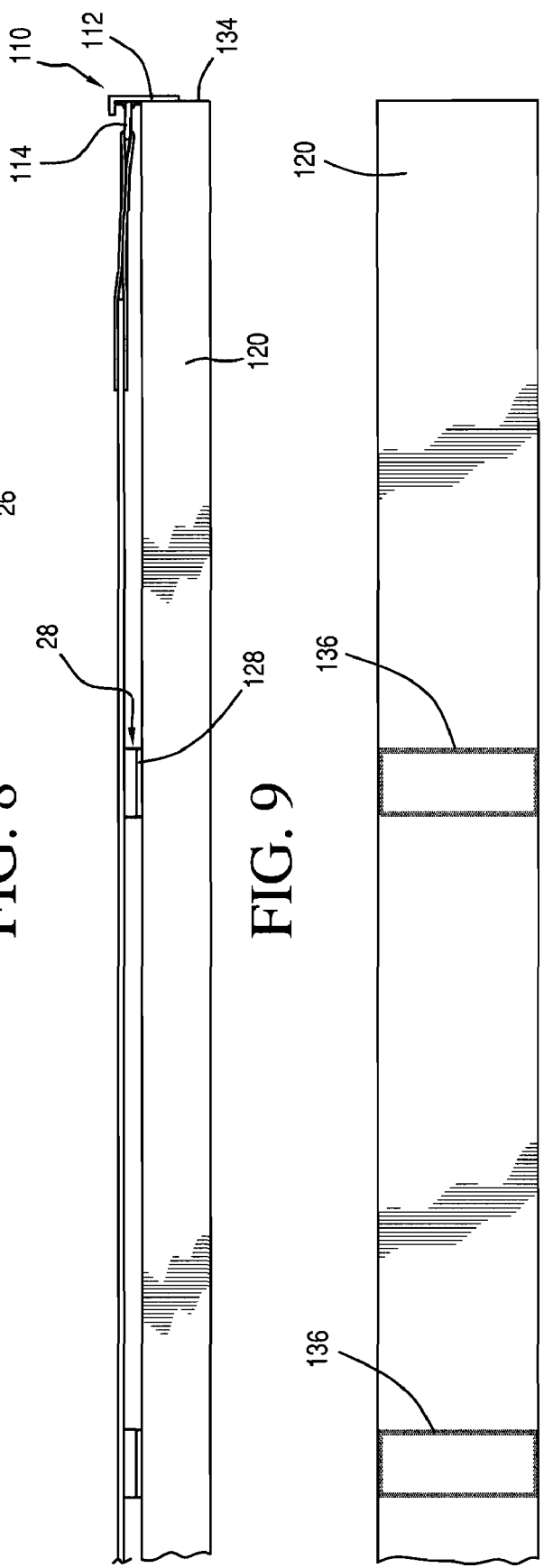
FIG. 8   FIG. 9   FIG. 10

US 7,555,843 B2

CONSTRUCTION LAYOUT MARKING DEVICE

FIELD OF THE INVENTION

The subject invention is directed generally to a construction layout marking device. More particularly, the subject invention is directed to a stud layout marking device. Most specifically, the subject invention is directed to a stud layout marking tape measure. A pair of flexible measuring tapes are stored in a reel housing in a parallel, spaced orientation. Marking templates are attached to the two measuring tapes at spaced locations. Each such template is provided with marking material. In use, the free ends of the two parallel measuring tapes can be secured to a floor plate or the like so that the tapes and their supported marking templates can be deployed over a surface of the floor plate to be marked. Transference of the marking media from the spaced templates to the underlying surface serves to lay out a desired pattern on that surface.

BACKGROUND OF THE INVENTION

In the construction of various structures, such as homes, sheds, small commercial buildings and the like, which construction is typically of a "stick-built" nature, it is well known to place wall studs at generally uniform spacings along a floor plate or a ceiling plate. Conventional wall studs used in most home construction are 2"×4" studs which are spaced apart from each other at 16" centers. Other stud sizes and other spacing configurations are also sometimes used. However, the preponderance of construction uses 2"×4" studs on 16" center spacings.

A framing crew, during the framing out of a typical house, will have to locate literally hundreds of wall studs on floor plates and on ceiling plates. One way to lay out the location of a plurality of studs along a floor plate or on a sub-flooring is to simply use a tape measure that is divided into typical inch and foot segments, and to strike a mark, using a pencil, at every 16" distance. Clearly, such a procedure is tedious, grossly repetitious, and tends to become inaccurate over time. The repeated measuring, bending and marking is increasingly done in a less than accurate fashion. The result is the orientation of wall studs which are out of alignment, out of plumb and which result in the erection of a wall or a building side that is not constructed in a uniform, workmanlike manner.

Various chalk lines are used to strike a straight line. The accuracy or plumbness of such a line depends on the skill of the person using the chalk line. If two lines are not parallel or perpendicular to each other, the result is a pair of walls that will also not be parallel or perpendicular to each other. Walls should meet at square corners. Too often, they do not because the wall studs were not properly laid out.

Stud layout templates are known in the construction field and are usable to mark the positions, which will be occupied by wall studs, on a floor plate or a ceiling plate. One significant limitation of a number of these devices is that they are either not sufficiently accurate, in the case of small templates, or that they are overly cumbersome, in the case of large templates. If the template is intended to be slid along a measuring tape and to be held stationary at every stud location, the opportunity for human error or lack of attention again arises. If the template still requires the bending, measuring and marking, as was the case with a simple measuring tape, the only benefit of the template is that it provides a generally rectangular marking on the floor onto while an end of a stud can be placed. If the template is not properly oriented, the marking on the floor plate or on the ceiling plate will not e properly oriented so the studs which are secured in place may not be oriented parallel to each other. The result is yet another wall that is out of plumb.

Large stud layout templates are quite effective but are seldom used. They start to become relegated to not being used because they are cumbersome to carry, take up too much space, cannot be put in a toolbox and tend to break. If the wall studs are to be laid out on 16" centers, a template that has a length of at least 16", so that the stud spacing does not have to be measured each time, is too bulky to be used on an ongoing basis.

Paper or similar flexible layout patterns are also available in the construction industry. These may be one use patterns or may be intended for a plurality of uses. In the case of one use paper patterns, they tend to degrade before all of the wall studs along a wall are installed. Paper has little dry strength and even less wet strength. A paper layout pattern that has been tacked or otherwise attached to a floor plate is apt to rip or to be torn before all of the studs along the wall have been nailed into place.

Reusable flexible patterns also tend to become ripped or torn once they are attached to the floor plate in a construction environment. A framing crew is interested in getting each house framed with a minimum expenditure of time. A person who is carrying a number of 2"×4" studs tends not to be particularly careful of flimsy plastic patterns tacked to the sub-flooring of a building under construction. The result is dislodgment or distortion of such patterns.

It is clear that a number of the generally known lay out procedures and devices in accordance with the prior art have structural and use limitations that have rendered them ineffective. There is a need for a construction layout marking device that overcomes these limitations of the prior art devices.

SUMMARY OF THE INVENTION

It is an object of the present invention to provide a construction layout marking device.

Another object of the present invention is to provide a stud layout marking device.

A further object of the present invention is to provide a stud layout marking tape measure.

Still another object of the present invention is to provide a stud layout marking device that is adjustable for different layout configurations.

Yet a further object of the present invention is to provide a stud layout marking device which is accurate.

Even still another object of the present invention is to provide a stud layout marking device which overcomes the limitations of the prior art and which will be useful in the field.

As will be set forth in detail in the description of the preferred embodiments, as are presented subsequently, the construction layout marking device in accordance with the present invention utilizes a pair of flexible measuring tapes which are deployable, in a spaced parallel orientation, from a reel housing. The two measuring tapes may be made of a durable, yet flexible material, such as spring steel or plastic. A distal or free end of each tape has a hook that is usable to connect the tape free end to an edge of a floor plate or the edge of a ceiling plate or to the edge of a section of a sub-floor. Each of the two parallel tape measures is provided with typical length measuring units; i.e. inches and feet.

The two tape measures are attached to a reel hub which is situated in a generally cylindrical housing. The reel hub is provided with an exterior crank handle so that it can be rotated to draw the tape measures onto the reel hub. If desired, the reel hub could be equipped with a retraction spring and with a suitable recoil preventer, such as a latch mechanism.

Marking templates are attached to the two spaced measuring tapes and are located at defined spacing distances along the two parallel measuring tapes. In the preferred embodiment, these marking templates are clear plexiglass that have chalk lines or strings affixed to their inner or lower faces. The chalk lines are dimensioned to approximate the size of an end of a typical 2"×4" wall stud. Each marking template is spaced at 16", on center, from adjacent similar marking templates that are also affixed to the two parallel measuring tapes.

In another embodiment, the construction layout marking tool in accordance with the present invention could have marking templates that could be displaceably secured to the two measuring tapes so that the center distances below successive ones of the templates could be varied. Alternatively, or in addition, the templates could be removed and replaced with ones of a different size or orientation.

The construction layout marking device in accordance with the present invention overcomes the limitations of the prior art devices. Each one of the marking templates is secured to the two measuring tapes so that as the tapes are pulled out of the reel housing that contains the reel hub, the marking templates are placed at the proper locations along the floor plate. Each one of the templates carries suitable marking materials, typically chalk lines, so that the imparting of a snapping motion to the deployed measuring tapes will cause the marking templates to impart appropriately sized chalk line indicia to the floor plate or to the sub-flooring. These spaced chalk line indicia will serve as location guides for the subsequent positioning of the wall studs.

Each marking template is securely attached to the respective ones of the two spaced, cooperating measuring tapes. It is not possible for the marking templates to become skewed with respect to each other. This will insure that the stud locating marks are square with respect to each other and that they will not contribute to the erection of a wall or walls that are not properly oriented.

The construction layout marking device in accordance with the present invention is durable, compact and easy to operate. It is deployed simply by attaching the hooks of the free ends of the two parallel measuring tapes to a suitable edge and by deploying the tapes and templates. The stud positions can be quickly marked by snapping the tapes and the tapes and templates can be retracted into the housing. The distance between the templates is fixed accurally. The device is not cumbersome or unwieldy and is thus apt to be used.

In contrast to paper or plastic patterns, the chalk line stud location indicators will not wear off in the time it takes to fasten a line of studs in place to form a wall. Once the marks have been struck and the tapes have been re-coiled, there is nothing to prevent an obstruction to work movement, in the course of carrying the studs to their proper location and securing them in place.

The construction layout marking device in accordance with the present invention overcomes the limitations of the prior art devices. It is a substantial advance in the art.

BRIEF DESCRIPTION OF THE DRAWINGS

A full and complete understanding of the construction layout marking device in accordance with the present invention may be had by referring to the detailed description of the preferred embodiment, as is set forth subsequently, and as illustrated in the accompanying drawings, in which:

FIG. 3 is a perspective view of the device with the marking tapes partially extended;

FIG. 4 is a perspective view similar to that shown in FIG. 3 and showing the device in a use position;

FIG. 5 is a cross-sectional view of the device, taken along line 5-5 of FIG. 1;

FIG. 6 is a bottom perspective view of a portion of the measuring tapes and one marking template in a first embodiment of the present invention;

FIG. 7 is a top perspective view of a portion of the measuring tapes and a second preferred embodiment of a marking template in accordance with the present invention;

FIG. 8 is a top plan view of a portion of the measuring tapes and marking templates;

FIG. 9 is a side elevation view of a portion of the measuring tapes and marking templates shown in FIG. 4; and FIG. 10 is a top plan view of a marking pattern resulting from the use of the construction layout marking device shown in FIG. 9.

DESCRIPTION OF PREFERRED EMBODIMENTS

Figure 1:
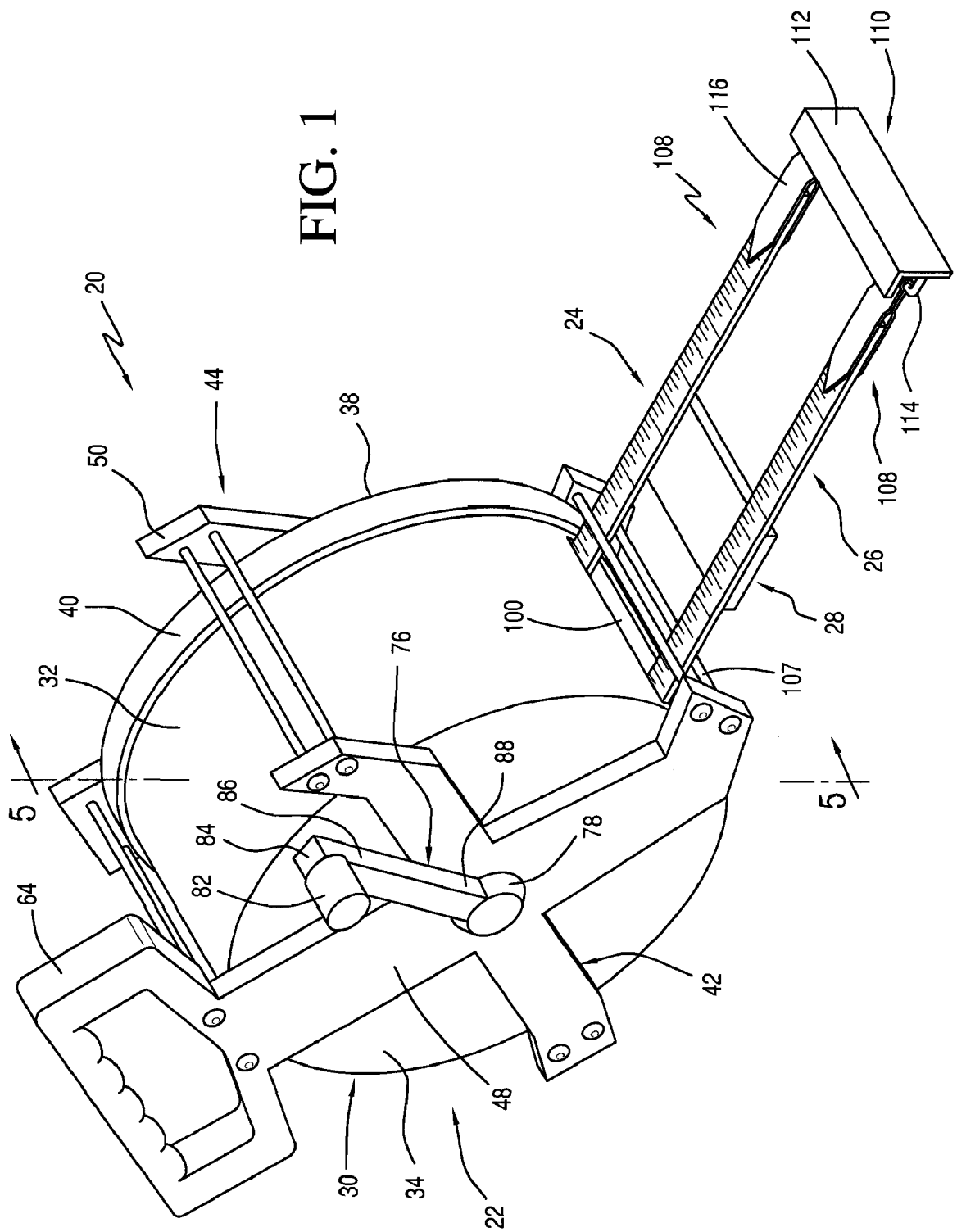
FIG. 1 is a perspective view of a preferred embodiment of a construction layout marking device in accordance with the present invention.

Referring initially to FIG. 1, there may be seen generally at 20, a first preferred embodiment of a construction layout marking device in accordance with the present invention. A reel housing, generally at 22, houses a pair of parallel measuring tapes 24 and 26. These two measuring tapes 24, 26 have attached thereto, at spaced locations, a plurality of marking templates with one such marking template being indicated generally at 28. As will be discussed in detail below, a plurality of such marking templates 28 are secured to the parallel measuring tapes 24, 26 at a pre-set spacing distance, which may be either fixed or adjustable. In use, the measuring tapes 24, 26 are deployed out of the reel housing 22, as depicted in FIGS. 3 and 4. The individual marking templates, generally at 28, are thus used to imprint layout markings to a floor plate or the like, as is depicted generally in FIGS. 4, 9 and 10, and as will also be discussed in detail shortly.

Figure 2:
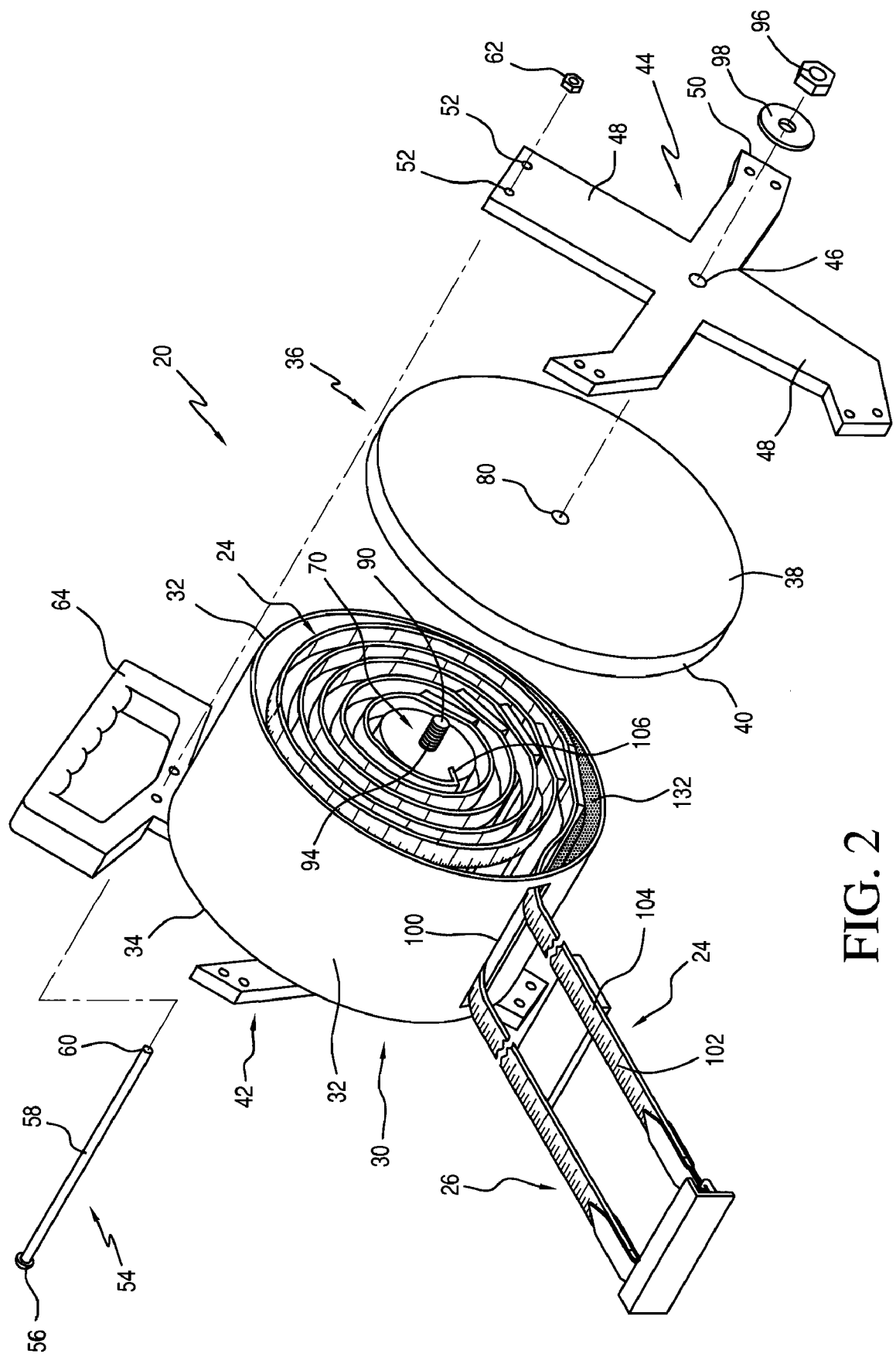
FIG. 2 is an exploded perspective view of the construction layout marking device shown in FIG. 1 and taken from the reverse side.

Referring again to FIG. 1, and taken in conjunction with FIG. 2, the reel housing, generally at 20 includes a generally cup-shaped reel case 30 defined by a cylindrical reel case sidewall 32 and by a reel case end plate 34. The reel case sidewall 32 and end plate 34 can be formed as a single article or can be two separate elements which may or may not be joined to each other. A reel case cover 36 includes a reel case cover plate 38 and a reel case cover flange 40. As may be seen in FIG. 1, the cover flange 40 is sized to fit over the sidewall 32 of the reel case when the reel case 30 and the reel case cover 36 are assembled. The result is a reel housing 22 that is closed, durable and protective of the contents, the wrapped or coiled measuring tapes 24, 26 and the attached marking templates 28, as may be seen in FIG. 2.

The reel housing 22 is provided with a handle spider 42 and with a cover plate spider 44. Each of these two spiders includes a central spider hub 46 and preferably four radially directed, equidistantly angularly spaced spider legs 48. Outboard ends 50 of each of these spider legs are provided with spaced leg end apertures 52, with two such leg end apertures 52 being provided at each outboard end 50 of each spider leg 48. Elongated securement bolts, generally at 54, are each provided with a securement bolt head 56, and with a securement bolt shank 58 that includes a threaded securement bolt distal end 60. Each of these securement bolts is sized so that it will be insertable through aligned ones of the spider leg end apertures 52 when the handle spider 42 and the cover plate spider 44 are positioned as depicted in FIG. 1, sandwiching the cup-shaped reel case 30 and its cover plate 38. Suitable securement nuts 62 are attachable to the threaded distal ends 60 of the securement bolts 54 to hold the handle spider 42 and the cover spider 44 in their reel body sandwiching position.

The handle spider, generally at 42, is designated as such because of its inclusion of a suitable grip handle 64 at an outboard end of one of the spider legs 48 of the handle spider 42. It will be understood that the grip handle 64 which is depicted in FIGS. 1 and 2 is meant to be exemplary of any number of grip handles 64 which could be formed on one or more of the spider legs 48 of the handle spider 42. It is clearly within the scope of the present invention to provide grip handles on more than one of the spider legs 48. It is also within the scope of the present invention to provide both of the spiders 42 and 44 as cover spiders so that each such spider could have one or more handles. The depiction of only one grip handle 64 on only one leg 48 of one of the spiders 42, 44 is meant to be exemplary of various arrangements of handles and spiders, all of which are within the scope of the present invention.

As may be seen most clearly in FIG. 2, and as is also shown in 5, a rotatable reel hub, generally at 70 is centered in the interior of the reel housing 22 and within the reel case 30. This reel hub 70 has an outer circumferential surface 72 which is provided with an axially extending, radially inwardly directed reel hub slot 74.

A reel crank, generally at 76 includes a crank hub 78 which extends through the handle spider hub 46, through a handle spider hub aperture that is not specifically depicted but which will be understood to be the same in location, but larger in diameter than the similar reel cover plate aperture 80 which may be seen in FIG. 2. The crank hub 78 is rotatable with respect to the handle spider 42 by manual operation of a crank handle 82 that is rotatably attached to an outboard end 84 of a crank arm 86. The crank hub 78 is situated at an inboard end 88 of the crank arm.

The reel hub, generally at 70 is provided with axially extending hub journals, only one of which is shown at 90 in FIG. 2 and the other of which is shown in cross-section at 92 in FIG. 5. The hub journal 92 which is adjacent the crank hub 78 is attached to that hub 78 by any suitable expedient so that turning of the reel crank 76 will import a rotary motion to the reel hub 70. The hub journal 90 which is shown in FIG. 2, and which is located at the end of the reel hub 70 axially opposite to the hub journal 90, is threaded, as seen at 94. That threaded reel hub journal 90 will pass through the reel cover plate aperture 80 when the reel housing 22 is assembled. A reel hub nut 96 and an enlarged reel hub washer 98 completes the assembly of the reel housing 22. As will be understood, the reel hub 70 is supported in the reel case 30 and is covered by the reel case cover 36. Hub 70 is rotated by operation of the crank handle 82, which is part of the reel crank 76. While not specifically shown or depicted, it will be understood that the reel hub 70 could have its journals 90, 92 supported on their respective spiders 42 and 44 by suitable bearings. It will also be understood that reel hub 70 could be provided with a suitable reel brake and possibly also with a recoil spring, as is generally known in the field of coilable and extendable tape measures. Such a reel brake could be used to hold the reel hub 70 in a particular position and the recoil spring could be used as an aid in the rotation of the reel hub 70 during retraction of the measuring tapes 24, 26 and their supported marking templates 28 both into the reel housing, generally at 22.

The reel housing, generally at 22, and all of its individual constituents, will be made of durable, resilient materials that will stand up to rough usage, as they are apt to encounter in the construction environment. A number of plastic and metal pieces can be combined to form the overall reel housing 22. It will be beneficial to make the reel case 30 and its associated reel case cover 36 using high-impact plastic. The cover 36 may be provided with a sealing gasket, which is not specifically depicted, to make it difficult for moisture to enter the interior of the reel case 30. The spiders 42, 44 can be made of high impact plastic or of metal and will to some extent serve to unite the reel case 30 and the reel case cover 36 while still allowing disassembly of the reel housing 22, if necessary. If desired, the entire construction layout marking device, generally at 20, could be supplied to the user housed in a plastic carrying case, which is not specifically shown, and which would be watertight and structurally rugged.

The two parallel measuring tapes 24, 26 which are coiled on the reel hub 70 and which are extendable out of a slot 100 in the sidewall 32 of the reel case 30, are typically made of spring steel and typically have a slightly curved or arched shape in their transverse direction. These measuring tapes 24, 26 can also be made of a durable plastic, if desired. Each tape has scale markings 102 on an upper surface 104. These scale marking 102 will typically be in inches and feet but could as easily be in metric measure. Each of the two tapes 24, 26 has an inner end 106 which is securely situated in the reel hub slot 74. If desired, the two tapes 24, 26 could have their respective inner ends 106 attached to a common strip or the like, which strip or the like could, in turn be inserted into the reel hub slot 74. Any type of securement of the tape inner ends 106 into the reel hub slot 74 is appropriate so long as it is positive and secure. It is important that this securement be positive and secure because the two tapes 24, 26 are intended to be attached to the reel hub 70 and to remain attached to the reel hub 70 so that they are parallel to each other and have the same lengths.

As may be seen in FIGS. 1 and 5, the slot 100 in the sidewall 32 of the case 30 is aligned with a gap between the two securement bolts 54 that are located at the outbound end of the spider leg 48 which is opposite to the grip handle 64. Each of these two securement bolts 54 may be provided with a metal sleeve or tension pin, generally at 107. As the two tapes 24, 26 are pulled out of the reel housing 22, or are reloaded back into the reel housing 22, they pass between the two securement bolts 54. The metal sleeves or tension pins 107 on the shanks 58 of these two securement bolts 54 allow the two tapes 24, 26 to move more easily. The space defined by these two securement bolts 54 is aligned with the tape slot 100 in the sidewall 32 of the reel case 300 and acts to guide the two tapes 24, 26 as they move into or out of the reel housing 22.

Each of the two measuring tapes 24, 26 has a tape free or outer end, generally at 108, as seen in FIG. 1. The outer ends 108 of the two tapes 24 and 26 are both attached to a transverse attachment strip 110. This attachment strip 110 is in the form of a small metal angle strip that includes an attachment leg 112 and a pair of attachment loops 114. The free ends 108 of the two measuring tapes 24, 26 are pivotally connected to the attachment loops 114 by tape end attachment straps 116. As seen in FIG. 1 these attachment straps 116 are positively attached to both the tape upper surface 104 and also to a tape lower surface 118. The tape outer or free ends 108 are thus securely but pivotally attached to the transverse attachment strip 110. It will be understood that the function of the attachment strip 110 is to connect the free ends 108 of the two parallel measuring apes 24, 26 to a floor plate 120, as seen in FIGS. 4 and 9, or to a similar edge so that the tapes 24, 26 can be held in place while the tapes are deployed out of the reel case 30 by rotation of the reel hub 70 either in response to turning of the reel crank 76 or by exerting a withdrawal force on the tapes. The attachment strip 110 depicted in FIG. 1 and the other drawings is intended to be exemplary of various tape leading or free end attachment means which will all function to hold the leading ends of the measuring tapes 24, 26 during use of the construction layout marking device.

As discussed briefly above, a plurality of marking templates, generally at 28, are attached to the two parallel measuring tapes 24, 26. In a first embodiment, as depicted in FIGS. 1, 2 and 6, each such marking template, generally at 28 is a generally rectangular template body, generally at 122, which template body 122 includes a template body lower face 124 and a template body upper face 126. The template body upper face 126 can be permanently secured to the tape lower surface 118 of each of the two measuring tapes 24, 26, as seen most clearly in FIG. 6. The template lower face 124 includes a length of chalk line 128 bordering the periphery of the marking template 28. Such chalk line is a well-known means for imprinting a chalk mark to the floor plate 120 or similar surface to be marked. As is depicted somewhat schematically in FIGS. 2 and 5, an inner surface 130 of the reel case side wall 30 is provided with a replenishable chalk block 132 which is situated adjacent the measuring tape reel case slot 100. It will be understood that the chalk block 132 is depicted in schematic form and that it could be provided as a piece of chalk held on a suitable receptacle or the like. The important aspect of the chalk block 132 is that it be situated so that it will impart chalk to the chalk line or string 128 on each of the marking templates 28 as those templates are drawn off the reel hub 70, on which they have been previously wound, for deployment along the floor plate 120 or other similar article to be marked, as seen in FIGS. 4 and 9.

The marking templates 28 may be made of clear plastic or of another similar durable, lightweight material. In the first preferred embodiment, which is depicted in FIGS. 1-6 and 8-10, the individual marking templates 28 are depicted as transparent or clear plastic plates that are permanently secured to the measuring tapes 24, 26 by any suitable expedient. The individual marking templates 28 are each sized to approximate the size of an end of a typical 2"×4" wall stud. Thus, each template 28 has a size of approximately 1½"× 3½". The templates 28 are secured to the two parallel tapes 24, 26 on 16" centers. As may be seen in FIG. 8-10, in use, the attachment leg 112 of the attachment strip 110 is placed against an end face 134 of floor plate 120. The two parallel measuring tapes 24, 26, and their attached marking templates 28 are deployed out of the reel housing 22 by either rotation of the reel crank 76 or merely by exerting a pulling force on the reel housing 22. As the marking templates 28 pass out through the reel case slot 100, the chalk lines 128 pick up a coating of chalk from the chalk block 132. Once the measuring tapes 24, 26 and the marking templates 28 have been properly positioned on the floor plate 120, for example, the measuring tapes can be "snapped" or moved vigorously up and down, as seen in FIG. 9. This will cause a chalk line pattern 136 to be imparted to the upper face of the floor plate 120. These chalk line patterns 136 will be spaced on 16" centers and will each be the same size as an end of a typical framing stud 2"×4". The chalk line patterns 136 will be square with respect to each other and to the floor plate 120, will be sufficiently permanent that they will not be scuffed off or obscured in the time it takes to actually position and fasten the wall studs, and can serve as both floor plate and ceiling plate guides.

As discussed, above, in the first embodiment of the construction layout marking device, generally at 20, in accordance with the present invention, the marking templates 28 are permanently attached to the two spaced measuring tapes 24, 26 on 16" centers. While that spacing, and the size of the templates as corresponding to the sizes of typical frame guide 2"×4" wall studs, is practical for most applications, in a second embodiment of the present invention, the individual marking templates 28 can be repositionably attached to the measuring tapes 24, 26 and can have different sizes.

As may be seen in FIG. 7, there is depicted, generally at 138 a second preferred embodiment of a marking template in accordance with the present invention. As seen in FIG. 7, the marking template has a lower face 140, an upper face 142 and a pair of side faces 144. Each such side face 144 of the marking template 138 includes an inwardly directed flange 146. These flanges are spaced from the marking template upper face 142 and cooperate with it to define a pair of measuring tape receiving channels 148. Each channel 148 is sized to receive a respective one of the measuring tapes 24, 26 in an interference fit manner. The marking templates 138 will thus be slidable, with some effort, along the measuring tapes 24, 26 to vary, if desired, the on-center spacing between adjacent ones of the marking template 138. Although not specifically depicted, it will also be understood that the marking templates 138 could be configured with different sizes of lower faces 140, such as would, for example conform, in size to a 2"×6", a 2"×8" or the like. Thus, the marking templates 138 could be provided in interchangeable sets that could be used with the same pair of measuring tapes 24, 26. It will, of course, be understood that the width of the reel housing 22 would have to be sufficient to accommodate the widest ones of the provided marking templates 138.

Instead of the laterally adjustable marking templates discussed above, the construction layout marking device, in accordance with the present invention could be provided in various different fixed size configurations. For example, a fixed size would be usable only with 2×4 studs on 16" centers. Another size could be usable with 2×6 studs on 24" centers. Since different framing protocols use different spacings for different sheet sizes, it may be more desirable to supply the construction layout marking device of the present invention in a multiplicity of single size configurations, instead of in a size adjustable configuration. Both configurations could be made available so that the end user could select the one he felt was best suited to his needs.

In use, the attachment strip 110, which will initially be located adjacent the reel case slot 100, when the two measuring tapes 24, 26 and the marking templates 28 are fully rolled onto the reel hub 70, will be grasped and pulled away from the reel housing 22, as depicted in FIG. 3. The attachment leg 112 can then be secured to an end face 134 of a floor plate 120, as depicted in FIGS. 4 and 8. The measuring tapes 24, 26 and their attached marking templates 28 will be deployed from the reel housing 22 and will overlie the floor plate 120. As discussed above, the deployed tapes and templates can then be "snapped" to impart the chalk line patterns 136 onto the floor plate 120. Once this has been done, the attachment strip 110 can be disengaged from the floor plate end 134 and the parallel measuring tapes 24, 26, with their plurality of marking templates 28, can be reeled back onto the reel hub 70 by use of the reel crank 76. The construction layout marking device is now safely stored and is ready for its next use.

While preferred embodiments of a construction layout marking device, in accordance with the present invention, have been set forth fully and completely hereinabove, it will be apparent to one of skill in the art that various changes in, for example, the lengths of the measuring tapes, the specific material used to fabricate the reel housing and the like could be made without departing from the true spirit and scope of the present invention which is accordingly to be limited only by the appended claims.

What is claimed is:

1. A construction layout marking device comprising:
   a reel housing including a reel case;
   a reel hub supported for rotation in said reel case;
   first and second spaced, parallel measuring tapes having first ends secured to said reel hub and having second ends extendable out of said reel case; and
   a plurality of marking templates, each being attached to both of said spaced measuring tapes, said plurality of marking templates being located at defined spacing distances along said spaced measuring tapes.

2. The device of claim 1 wherein said reel case is generally cup-shaped and further including a reel case end plate, said reel case end plate cooperating with said reel case and defining a closed reel housing.

3. The device of claim 2 further including first and second reel housing spiders secured to said reel case and to said reel case end plate.

4. The device of claim 3 further including a plurality of spider legs on each of said reel housing spiders, each of said spider legs having an outboard end.

5. The device of claim 4 further including spider securement bolts extending between said outboard ends of cooperating ones of said spider legs of said first and second reel housing spiders.

6. The device of claim 2 further including a reel case slot in said reel case, said first and second spaced parallel measuring tapes passing through said reel case slot.

7. The device of claim 3 further including a handle on at least one of said first and second reel housing spiders.

8. The device of claim 1 further including a reel crank attached to said reel hub and usable to rotate said reel hub in said reel housing.

9. The device of claim 8 wherein said reel crank includes a crank hub connected to said reel hub and a crank arm.

10. The device of claim 1 wherein each of said marking templates has a template body including a template body upper face in engagement with said spaced, parallel measuring tapes.

11. The device of claim 10 further including a template body lower face adapted to engage a surface on which said device is deployed.

12. The device of claim 11 further including means on said template body lower face to impart a mark to the surface on which said device is deployed.

13. The device of claim 12 wherein said mark imparting means is a chalk string on said template body lower face.

14. The device of claim 13 further including a chalk supply in said reel case and engagable with said chalk string on each said marking template.

15. The device of claim 14 wherein said chalk supply is a chalk block in said reel case.

16. The device of claim 15 further including a reel case slot in said reel case and wherein said chalk block Is located in said reel case adjacent said reel case slot.

17. The device of claim 1 further including an attachment strip connecting said second ends of said spaced, parallel measuring tapes.

18. The device of claim 17 wherein said attachment strip includes an attachment leg adapted to engage an object on which said spaced, parallel measuring tapes are to be deployed.

19. The device of claim 17 wherein said attachment strip is pivotably attached to said second ends of said first and second spaced measuring tapes.

20. The device of claim 1 further including means on each said marking template to vary said defined spacing.

* * * * *